April 28, 1931.  O. M. SUMMERS  1,802,451

REFRIGERATING APPARATUS

Filed Dec. 31, 1928

Inventor
Otto M. Summers

By Spencer, Hardman + Fehr
Attorney

Patented Apr. 28, 1931

1,802,451

UNITED STATES PATENT OFFICE

OTTO M. SUMMERS, OF DAYTON, OHIO, ASSIGNOR TO FRIGIDAIRE CORPORATION, OF DAYTON, OHIO, A CORPORATION OF DELAWARE

REFRIGERATING APPARATUS

Application filed December 31, 1928. Serial No. 329,367.

This invention relates to refrigerating apparatus and especially to a transmission means between the driving and driven members of the same.

An object of the invention is to maintain an even tension on the belt between the driving and driven members at all times.

An object of the invention is to automatically take up any stretch or wear of the belt.

An object of the invention is to mount the driving member so that noises will not be communicated to the mounting or the cabinet.

Further objects and advantages of the present invention will be apparent from the following description, reference being had to the accompanying drawings, wherein a preferred form of the invention is clearly shown.

In the drawings:

Fig. 1 discloses a side elevation of the refrigerating system to which the invention may be applied.

Figure 1:
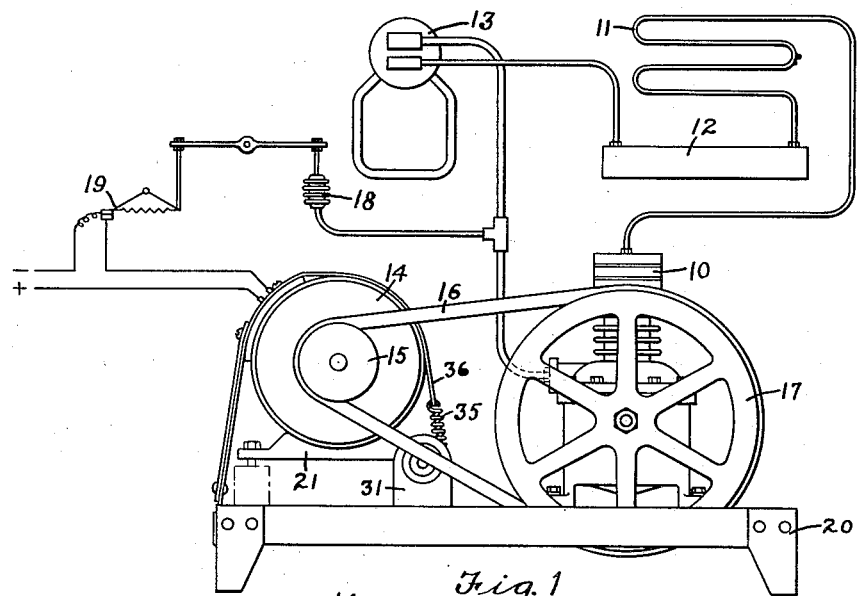

The refrigerating system disclosed in Fig. 1 comprises a compressor 10, a condenser 11, a receiver 12 and an evaporator 13. This system is run by the motor or driving member 14 operating through its pulley 15 and belt 16 to run the compressor through its pulley 17. The motor is controlled through the valve 18 and snap switch 19. The motor and compressor are mounted on the platform 20.

The invention is not intended to be limited by the particular form and position of the above described elements as these elements are more or less illustrative of a system to which the invention may be applied. The motor 14 having preferably a cylindrical casing is mounted upon a base 21 and preferably revolves in the direction of the arrow. This base is preferably supported at one end by bolts 25 to a shaft or cross bar 22. The position of the bolts 25 may be changed along the base 21 if it is desired to change the pull due to the weight of the motor. Reduced end 23 of this shaft 22 is preferably mounted in two rubber cushions or rollers 24 or the like. Dished plates 26 preferably bear against the inner sides of rollers 24. Adjusting nut 27 bears against this plate 26 and by its pressure controls or regulates the resiliency or yielding quality of the rubber or other equivalent substance 24. Nut 28 locks the adjustment in any desired position. Dished bearing plates 29 surround a portion of the circumference of the cushions 24 and they preferably support these cushions in position in circular holes in the upturned flanges 31 of the U-shaped base angle 32. Bolts 33 secure the base angle 32 to the platform 20. A screw or other fastening means 34 is preferably attached to the cross bar 22. Spring 35 is preferably attached at one end to the screw 34 and to the other end of a belt or flat spring 36. This belt 36 partly surrounds the casing of the motor and driving member 14 and is preferably attached at its other end to the flange 37 of the platform 20 by the U-shaped clamp 38 and is secured thereto by the pointed set screw 39. The belt bears against the casing of the motor 14 and preferably a snubber shoe 41 is inserted between a belt and a casing of the motor 14. This snubber shoe is preferably composed of rubber or rubberized fabric. The pressure of the shoe prevents a vibration of the motor about its pivot in synchronism with the varying belt pull caused by the varying demands of the compressor in its cycle of operation. If desired a stiffener 40 may be attached to the belt 36. This stiffener 40 maintains the brake shoe in proper position and prevents flapping of the band between 37 and 41 with each downward movement of the motor. In shipping a block 42 and bolt 43 support the unsupported end of the motor base 21, but this shipping bolt and block are removed when the motor is set up for operation.

Figure 2:
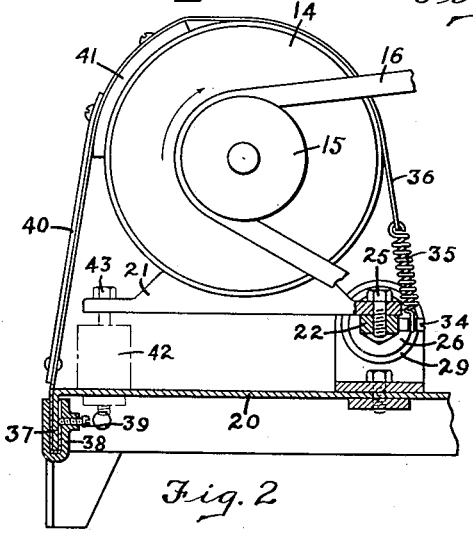
Fig. 2 is a side view of the invention as applied to the motor of a refrigerating apparatus.
Figure 3:
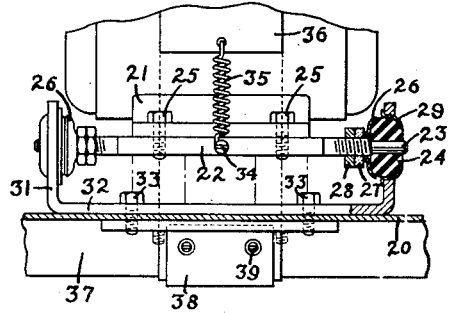
Fig. 3 is an end view of Fig. 2.
Figure 4:
Fig. 4 is a detailed view of the shipping block and bolt.

As disclosed in Fig. 2 the shaft 22 may be yieldably mounted in the rubber cushions 24 to support the motor in an off center position. The weight of the motor would thereby tend to move the motor counter-clockwise about the shaft 22. Such movement would automatically extend to the limit allowed by the belt 16. Any wear or stretch of the belt 16 would be automatically taken up by such movement of the motor. It is desired, however, to prevent any movement of the motor towards the compressor so that the belt will not be loosened. The belt 36 under the tension of the spring 35 tends to prevent such movement in an upward direction towards an on-center position. A snubber shoe 41 affords additional means for preventing this upward movement by bearing against the casing of the motor on the opposite side of the pulley from the shaft 22. The position of the shoe 41 in respect to the motor axis and motor support is preferably chosen so that movement of the motor downward will be permitted by the weight of the motor overcoming the slight friction but upward movement of the motor will increase the friction between shoe 41 and the casing of the motor. It will be further noted that the cushions 24 are of rubber and absorb the vibrations of the motor 14 communicated thereto. Some advantages of the invention may be obtained by applying such a mounting to the compressor. It is preferable, however, to apply it to the motor or driving member.

While the form of embodiment of the invention as herein disclosed, constitutes a preferred form, it is to be understood that other forms might be adopted, all coming within the scope of the claims which follow.

What is claimed is as follows:

1. In a refrigerating apparatus, a driving member, a driven member, one of said members being yieldingly pivoted and a snubber shoe bearing against and substantially encircling the casing of said last mentioned member.

2. In a refrigerating apparatus, a driving member, a driven member, one of said members being yieldingly pivoted upon a support, a band partly surrounding said pivoted member and a snubber shoe attached to said band and bearing against the casing of said pivoted member.

3. In a refrigerating apparatus, a driving member, a driven member, one of said members being yieldingly pivoted upon a support, a band attached to said support and partly surrounding said pivoted member, said band contacting with the casing of said pivoted member.

4. In a refrigerating apparatus, a driving member, a driven member, one of said members being yieldingly pivoted upon a support, a band attached to said support and partly surrounding said pivoted member, said band contacting with the casing of said pivoted member and a spring attached to one end of said band.

5. In a refrigerating apparatus, a driving member, a driven member, one of said members being yieldingly pivoted upon a support, a band attached to said support and partly surrounding said pivoted member, said band contacting with the casing of said pivoted member and a snubber shoe attached to said band and bearing against the casing of said pivoted member.

6. In a refrigerating apparatus, a driving member, a driven member, one of said members being yieldingly pivoted upon a support, a band partly surrounding said pivoted member, a snubber shoe attached to said band and bearing against the casing of pivoted member, and means attached to said band to maintain said snubber shoe in proper position in respect to said casing.

7. In a refrigerating apparatus, a driving member, a driven member, one of said members being yieldingly pivoted upon a support, a band partly surrounding said pivoted member, a snubber shoe attached to said band and bearing against the casing of pivoted member, and a stiffener attached to said band to maintain said snubber shoe in proper position in respect to said casing.

8. In refrigerating apparatus, a driving member, a driven member and belt means connecting said members, one of said members being yieldingly mounted to move away from the other of said members to thereby maintain said belt means taut, and snubber means frictionally engaging the casing of the yieldingly mounted member to prevent substantial movement of said yieldingly mounted member towards the other of said members.

9. In refrigerating apparatus, a driving member, a driven member and belt means connecting said members, one of said members being pivotally mounted to move away from the other of said members to thereby maintain said belt means taut, and snubber means frictionally engaging the casing of the pivotally mounted member to prevent substantial movement of said pivotally mounted member towards the other of said members.

In testimony whereof I hereto affix my signature.

OTTO M. SUMMERS.